US011220037B2

(12) United States Patent
Finger et al.

(10) Patent No.: US 11,220,037 B2
(45) Date of Patent: Jan. 11, 2022

(54) DEVICE AND METHOD FOR SWITCHING TIME COMPENSATION ON THE VALVE BLOCK

(71) Applicant: KRONES AG, Neutraubling (DE)

(72) Inventors: Dieter Finger, Neutraubling (DE); Gerald Huettner, Vilseck (DE)

(73) Assignee: KRONES AG, Neutraubling (DE)

( * ) Notice: Subject to any disclaimer, the term of this patent is extended or adjusted under 35 U.S.C. 154(b) by 75 days.

(21) Appl. No.: 16/620,544

(22) PCT Filed: Jun. 22, 2018

(86) PCT No.: PCT/EP2018/066704
§ 371 (c)(1),
(2) Date: Dec. 9, 2019

(87) PCT Pub. No.: WO2019/002113
PCT Pub. Date: Jan. 3, 2019

(65) Prior Publication Data
US 2020/0238588 A1    Jul. 30, 2020

(30) Foreign Application Priority Data
Jun. 26, 2017 (DE) .................... 10 2017 114 138.3

(51) Int. Cl.
*B29C 49/78* (2006.01)
*B29C 49/06* (2006.01)
(Continued)

(52) U.S. Cl.
CPC ............ *B29C 49/06* (2013.01); *B29C 49/783* (2013.01); *B29C 49/12* (2013.01); *B29C 49/4289* (2013.01);
(Continued)

(58) Field of Classification Search
CPC ........ B29C 49/4289; B29C 2049/5803; B29C 49/783; B29C 2949/7837;
(Continued)

(56) References Cited

U.S. PATENT DOCUMENTS

2009/0146332 A1* 6/2009 Linke .................... B29C 49/12
264/40.1
2009/0306830 A1* 12/2009 Cummings ........ G05B 23/0283
700/282
2015/0097306 A1    4/2015 Finger et al.

FOREIGN PATENT DOCUMENTS

DE    102012110023 A1    4/2014
EP       2199061 A1    6/2010
(Continued)

OTHER PUBLICATIONS

International Search Report dated Sep. 24, 2018 for PCT/EP2018/066704.

*Primary Examiner* — Robert B Davis
(74) *Attorney, Agent, or Firm* — Schmeiser, Olsen & Watts, LLP

(57) ABSTRACT

Provided is a device for reshaping plastic parisons into plastic containers, including a plurality of blow moulding stations each having blow mould devices which form a cavity, inside which the plastic parisons can be reshaped into plastic containers, and including at least one application device by which a flowable medium can be applied to the plastic parisons for expansion thereof, and at least one valve device which is arranged between at least one pressure reservoir and at least one application device and by which the supply and/or removal of the flowable medium, in particular under high pressure, in particular the blowing pressure and/or volume flow thereof, to the application device can be influenced or controlled.

19 Claims, 3 Drawing Sheets

(51) Int. Cl.
 *B29C 49/12* (2006.01)
 *B29C 49/42* (2006.01)
 *B29C 49/58* (2006.01)

(52) U.S. Cl.
 CPC ............... *B29C 2049/5803* (2013.01); *B29C 2949/7889* (2013.01); *B29C 2949/78537* (2013.01); *B29C 2949/78554* (2013.01); *B29C 2949/78621* (2013.01)

(58) Field of Classification Search
 CPC ........... B29C 2949/78554; B29C 2949/78621; B29C 2949/7889
 See application file for complete search history.

(56) References Cited

FOREIGN PATENT DOCUMENTS

| | | |
|---|---|---|
| EP | 2669070 A1 | 12/2013 |
| EP | 2829379 A1 | 1/2015 |
| FR | 3017327 A1 | 8/2015 |
| WO | 2011023155 A1 | 3/2011 |
| WO | 2016083711 A1 | 6/2016 |

\* cited by examiner

DEVICE AND METHOD FOR SWITCHING TIME COMPENSATION ON THE VALVE BLOCK

CROSS-REFERENCE TO RELATED APPLICATIONS

This application claims priority to PCT Application No. PCT/EP2018/066704, having a filing date of Jun. 22, 2018, based on German Application No. 10 2017 114 138.3, having a filing date of Jun. 26, 2017, the entire contents both of which are hereby incorporated by reference.

FIELD OF TECHNOLOGY

The following relates to a device and a method for reshaping plastic parisons into plastic containers, comprising a plurality of blow moulding stations which each have blow moulding means or a blow mold, which form a cavity inside which plastic parisons can be reshaped into plastic contains.

BACKGROUND

Devices and methods for reshaping plastic parisons into plastic containers have been known for a long time from the conventional art. Usually for each blow moulding station an application device is provided, by means of which a flowable medium can be applied to the plastic parisons for expansion thereof. In this case the flowable medium is fed from a pressure reservoir via a valve block which is arranged between the pressure reservoir and the application device and by means of which the feeding of the flowable medium, in particular under high pressure, can be controlled. The valves of the valve blocks have the task of setting pressures of up to 40 bars. Moreover, very high-volume flows should be produced in order to achieve the highest possible station output. The valve pistons therefore have a very large diameter and must therefore apply very high forces for opening or closing. A purely electrical actuation is not possible, since the switching currents would be too great for the digital output modules. Instead, pilot valves are used for pneumatic pilot control.

The devices and methods which are currently known from the conventional art give rise to the disadvantage that in the case of pneumatic valves no constant and consistent switching time can be ensured, since they are subject to a certain variation. An even greater variation is produced by the series connection of pilot valve and high-pressure valve. A variation must also be expected between the different stations. All these factors reduce the consistent quality of the bottles.

SUMMARY

An aspect relates to improving the machine so that a predetermined switching state of the valves is reached as exactly as possible at a predetermined process time, that is to say to minimise the aforementioned variation of reaching a predetermined switching state of the valve or valves as much as possible.

A device according to embodiments of the invention for the treatment of containers, in particular for reshaping plastic parisons into plastic containers, comprising a plurality of blow moulding stations each having blow mould devices which form a cavity, inside which the plastic parisons can be reshaped into plastic containers, has at least one application device, by means of which a flowable medium can be applied to the containers, in particular the plastic parisons for expansion thereof, and the device (and one of the blow moulding stations thereof) has at least one valve device which is arranged between at least one pressure reservoir and at least one application device and by means of which the supply and/or discharge of the flowable medium, in particular under high pressure, in particular the blowing pressure and/or volume flow thereof, to the application device can be influenced or controlled.

In this case high pressure is understood to be a pressure greater than 10 bars, greater than 20 bars, greater than 30 bars, greater than 35 bars and particularly up to 40 bars. In this case the valve device is a high-pressure valve. The flowable medium is in particular a gaseous medium, but the use of a liquid medium would also be conceivable.

According to embodiments of the invention, the device has at least one regulating device, which is suitable and intended to regulate a state of the valve device, in particular an open state and/or a closed state of the valve device, or to regulate carrying out a change of state of the valve device at (at least) a predetermined time for treatment of the plastic containers (plastic parisons or plastic containers) and/or a predetermined process angle of the blow moulding station.

The regulation is customised for at least one blow moulding station, advantageously for each valve device of the blow moulding station, and particularly an individual regulation is carried out, customised/individually, for each blow moulding station, in particular each valve device. This offers the advantage that for instance a temperature dependence of a valve device, which according to experience, even with structurally identical valve devices, has a different or variable effect, can be compensated individually as required for each individual valve device.

The containers, or the plastic parisons, are advantageously transported along a circular path, wherein for example a plurality of blow moulding stations can be arranged on a blow moulding wheel. Thus, the treatment time or process time is advantageously understood to be a time which is associated with a specific blow moulding station or a specific plastic parison. In this case this time can also be given or measured as the time difference between the current/present time and the time at which the blow moulding station or the plastic parisons were at a predetermined location. A specific position of the blow moulding station or of the plastic parison on the transport path, for instance the position of the blow moulding station at which the plastic parisons are transferred to the blow moulding station, is suitable for instance as the predetermined location. In the case of a circular transport path, a so-called process angle is often associated with a specific position of a blow moulding station on this circular line, and this process angle can then be stated alternatively to the time for treatment of the plastic containers (in the case of fixed, particularly constant, transport speed or rate of rotation of the blow moulding station).

In other words, for (at least) one (fixed) predetermined treatment time or a (fixed) process angle the device is predetermined with a target state of the valve device which this device should adopt at this treatment time or at this process angle. In this case this may be an open state of the valve device in which the flow cross-section of the flowable medium controlled by this valve device reaches its maximum, or a closed state of the valve device in which the flow cross-section is completely closed, or a state of the valve device in which the flow cross-section controlled by this valve device is merely restricted, but not completely closed. It is sufficient or advantageous that only a (completely) open state and a (completely) closed state is provided. In this case regulation takes place by comparison of the actual state with the target state of the valve device at the predetermined treatment time or the predetermined process and an adaptation of the characteristic parameters for the state of the valve device. However, the regulation may also take place in such a way that the (treatment) time or the process angle at which the valve device reaches the predetermined target state is detected, and this detected (treatment) time or process angle is compared with the predetermined treatment time or process angle, and as a function of this comparison an adaptation or alteration of the characteristic parameters for the state of the valve device is carried out.

In this case an adaptation or alteration of the characteristic parameters for the state of the valve device takes place in such a way that these parameters (only) take effect in a following treatment cycle or transport cycle or (treatment) round. In this case a treatment cycle or transport cycle or treatment round is understood to be a single complete pass through of a blow moulding station along the transport path, that is to say until the blow moulding station has again reached a starting position of the transport path, at which for example the next plastic parison is fed to the blow moulding station, is expanded to form a plastic container, and is finally transferred to a further transport device.

Such regulation takes place over a plurality of treatment cycles, and such regulation is carried out in each treatment cycle. The actual state of the valve device at a predetermined treatment time approximates (ever) more closely, in (each) one following treatment cycle, to the target state of the valve device. The (actual) time or (actual) process angle at which the valve device has reached or assumed a (fixed) predetermined (target) state approximates (ever) more closely, in (each) one following treatment cycle, to the (fixed) predetermined (target) time or (target) process angle.

Such regulation (which takes place over a plurality of treatment cycles) offers the advantage that the available process time (for instance predetermined by the duration of a complete rotation of the blow moulding wheel) can be utilised better. Due to a narrowing of the (temporal) variance relating to the time at which a predetermined target state of the valve device of the blow moulding station is achieved or implemented and which then in turn determines the time or the process angle from which a specific treatment operation is initiated (for instance the application of a predetermined pressure level to a plastic parison), it is necessary to plan only for a smaller tolerance time window for the initiation of this processing operation. As a result, a consistently higher bottle quality can be achieved. At the same time the process window is also enlarged, so that with different process-influencing parameters greater variations are possible. Also, if applicable for instance a longer process time can be used for a further processing operation.

The application devices can for example be a blow moulding die which is placed onto a mouth of the plastic parisons before expansion thereof.

In an advantageous embodiment the machine has at least one pneumatically operating pilot control device (a pneumatic valve), which is suitable and intended for activating the valve device, and the regulating device implements/performs a regulation of the valve device exclusively by means of control of the pilot control device. The pilot control device is at least not exclusively an electrical and/or electronic device. The pilot control device can be a further valve device, for instance a pilot valve. Thus the valve device is (also) activated exclusively by means of control of the pilot control device, which, as mentioned in the introduction, may be advantageous in so far as due to the control of the valve device by means of a pneumatically operating pilot control device, for instance by means of a so-called pilot valve, both high pressures, for instance up to 40 bars, and also very high volume flows through the valve device can be set or controlled. For this purpose, large valve piston diameters are necessary in such a way that they cannot be operated electrically. However, in contrast to an electrically controlled valve device, disadvantageously due to the pneumatic mode of operation of the control an (additional) "reaction time" or trigger time occurs which delays the connection of the valve device from the time of the electrical switching signal for connection of the pilot control device until the required state of the valve device is reached. Such a reaction time or trigger time is compensated for by the regulation performed by the regulating device.

In a further advantageous embodiment, the valve device has at least one valve which has a valve piston guided in a cylinder, and the blowing pressure and/or the volumetric flow rate of the flowable medium depends at least at times upon the position of the valve position.

A characteristic parameter, such as for instance a piston position, of the pilot control device is used as manipulated variable for the regulation (carried out by the regulating device). However, it is also conceivable for an electrical switching signal, which can serve for initiation of a change of a piston position of the pilot control device, to be used as manipulated variable. In this case the pilot control device can be activated by means of a stepping motor, which in turn is particularly controlled by means of an electrical switching signal. A change of the manipulated variable then influences the control variable, directly or indirectly, which for instance can be selected as the actual position of a valve piston of the valve device or as the actual treatment time or actual process angle at which the valve device has reached a specific/predetermined state, for instance a specific/predetermined piston position.

In a further advantageous embodiment, the pneumatically operating pilot control device is suitable and intended for, at least indirectly and directly, influencing the control of the feeding and/or discharge of the flowable medium effected by means of the valve device. The pilot control device is suitable and intended for varying the piston position of the valve device, for instance by acting on a piston surface of the piston of the valve device.

In a further advantageous embodiment the regulating device has at least one sensor device which at least intermittently detects at least one measurement value which is at least indirectly characteristic for a current control effected by the valve device for feeding and/or discharging the flowable medium, in particular for a state of the valve device, and the regulating device performs/effects regulation as a function of this detected measurement value.

In a further advantageous embodiment, the sensor device at least intermittently detects the position of the valve piston inside the cylinder and the regulating device performs the regulation of the valve device as a function of this position.

In a further advantageous embodiment, the sensor device is selected from a group comprising microswitches, inductive proximity switches, other electronic or electromechanical components or combinations thereof.

In a further advantageous embodiment, the machine has at least one time measuring device which at least intermittently detects at least one time at which the valve device reaches a predetermined state, in particular a predetermined open and/or closed state. The device advantageously has for each blow moulding station at least one time measuring device which at least intermittently detects a time at which the valve device reaches a predetermined state.

In a further advantageous embodiment, the time measuring device, each of the time measuring devices, at least intermittently detect(s) a time at which the measurement value detected by the sensor device reaches and/or exceeds a predetermined measurement value. It is also conceivable that the time at which a predetermined measurement value is undershot is detected. The time measuring device detects a time at which the valve piston of the valve device has reached a predetermined position.

In a further advantageous embodiment, the device has an evaluation device which compares at least the time measured by the time measuring device with a predetermined time and as a function of the result of this comparison it performs a change to the control of the valve device and in particular a change to the control of the pilot control device, a change to the switching time of the valve device particularly in a following treatment cycle of the blow moulding station. Therefore, this time is used as a control variable within the regulation. In this case a following treatment cycle of the blow moulding station is understood to mean that these changes to the switching time only take effect or are performed during the expansion process of a following, a next following plastic parison, following the plastic parison which at the time of the measurements is located in the blow moulding station. The change to the switching time of the valve device is performed in the directly following, that is to say next, treatment cycle. However, it is also conceivable that the changes are only performed in a next but one or in a further, for instance the third, fourth, fifth, sixth, or more than sixth, following treatment cycle.

In each blow moulding station, the times of the electrical switching signals up to actuation of the respective sensor, for example a proximity sensor, are measured. In the next round the measured times are included as lead time, that is to say the control signal is output earlier by the measured time than the desired target time: The switching time of the valve or the valve device is therefore calculated in the following round (in the following treatment cycle) as target time minus the measured lead time. At the same time new measurements are also carried out again, which then in turn apply for the following round, etc. Thus, it is also possible to compensate for a slow drifting away, which takes place for example due to the shrinking.

Therefore, in each treatment cycle the evaluation device determines a measured lead time or a measured switching time of the valve device, resulting from the difference between the (predetermined or desirable) target switching time of the valve device and the actual switching time determined by means of the time measuring device. In a following treatment cycle, in the next following treatment cycle, the switching time (for precisely this switching operation of the valve device) is initiated by the regulating device earlier or later by the amount of this measured switching time (depending upon whether the difference was positive or negative). Thus, the switching time of a valve device depends upon (at least) a time detected by the time measuring device in a preceding (immediately preceding) treatment cycle and/or at least one measurement value detected by the sensor device in a preceding (immediately preceding) treatment cycle on precisely the valve device and precisely the same blow moulding station.

On a predetermined valve device (on at least one and particularly on each) of a predetermined blow moulding station, the regulating device induces the sensor device, in each treatment cycle of this blow moulding station at least during a switching operation of the valve device, to detect a measurement value which is characteristic for a position of the valve piston of the valve device, and the time measuring device at least during a switching operation of the valve device detects a time at which the measurement value detected by the sensor device substantially reaches and/or exceeds a predetermined (target) measurement value. The regulating device preferred instigates such a measurement of the sensor device or the time measuring device for each switching operation of the valve device. Therefore, the regulating device carries out the regulation of at least one (advantageously precisely one) switching operation or the regulation of at least one change to a switching state of the valve device. Particularly the regulating device carries out the regulation of at least two (advantageously precisely two) switching operations or the changes of a switching state of the valve device, specifically an opening of the valve device and a closing of the valve device, particularly in this order. In this case these (two) regulations can take place independently of one another during independent switching operations of the valve device within a treatment cycle. In other words, for each of these regulations a different control variable or manipulated variable (within the same treatment cycle) can be used.

In a following, particularly in the next following treatment cycle, only a change to a switching time of the (current) treatment cycle takes place, if the control variable or the measured switching time lies outside a tolerance range. It would be conceivable for instance that no change to the switching time takes place, if the time when the desired change of state of the valve device (the predetermined position of the valve piston) is actually reached deviates from the target switching time by less than 10 ms, 5 ms, 3 ms and particularly less than 1 ms.

In a further advantageous embodiment the machine has more than one valve device and a plurality of valve devices by means of which the supply of pressure to the application device is controllable in particular at various pressure levels, and a separate regulating device is associated with each valve device. For this purpose, each individual blow moulding station of the device can have a valve block which in turn comprises this plurality of valves. In this case each valve device also has its own pilot control device. At least one blow moulding station and particularly all blow moulding stations have at least two valve devices which enable an application of pressure levels which are different from one another to the plastic containers or the plastic parisons.

In a further advantageous embodiment, the valve device has at least one relief valve, by means of which the blow moulding station and the blow mould device thereof can be at least partially be relieved of pressure. A regulating device which is described above, and in particular regulates a switching time of the valve device, can also be provided for this relief valve. At least a proportion of the flowable medium from the plastic containers can be returned into at least one pressure reservoir by means of the relief valve or is returned by means of the relief valve. In a further advantageous embodiment, the device can in particular also have outlets for each blow moulding station by means of which compressed air can be vented to the environment. In this case a silencer can also be additionally in the region of this outlet.

The device or the blow moulding station and each blow moulding station has a preliminary blow moulding valve which controls a flowable medium, which is provided from a first pressure reservoir, for preliminary blow moulding of the plastic parison with a first pressure. Furthermore an intermediate pressure valve is provided, which controls the flow of flowable medium, from a second pressure reservoir, which provides the flowable medium with an intermediate pressure for intermediate blow moulding of the plastic parison with this second intermediate pressure. In this case the intermediate pressure is higher than the first pressure and, moreover, can vary. Furthermore, a third valve, a final blow moulding valve, is provided, which controls the application of flowable medium to the plastic parison at a third pressure, which in turn is higher than the second pressure, for final blow moulding of this plastic parison. This pneumatic medium at the third pressure is provided from a third pressure reservoir. All valves, the preliminary blow moulding valve, the intermediate pressure valve, the final blow moulding valve as well as the relief valve, can have a regulating device according to embodiments of the invention, but also only individual ones of these valves or individual combinations thereof can have a regulating device. It is also conceivable that at least, and only for the preliminary blow moulding valve, a regulating device is provided. In fact, it has been shown that in particular the preliminary blow moulding has a major influence on the container quality, whilst the intermediate blow moulding pressure serves predominantly to reduce the consumption of air.

Advantageously at least one pressure reservoir or a reservoir for the flowable medium is designed as an annular conduit, which supplies a plurality of blow moulding stations or reshaping stations with compressed air. In this case these individual reshaping stations advantageously, each have a blow mould, but in addition also have other components, such as for example blow mould holders, which can be unfolded or folded up for opening and closing. In addition, these reshaping stations in each case also have stretching rods for expanding the plastic parisons. The device is advantageously arranged at least partially inside a clean room. Advantageously the clean room surrounds the transport path of the containers (at least partially and at least in the region in which the blow moulding wheel is arranged) like a channel. Furthermore, this clean room is delimited by means of at least one wall relative to unsterile surroundings.

In a further advantageous embodiment, the evaluation device is suitable and intended for determining an ageing state of at least one valve of the valve device at least intermittently as a function of the measurement value detected by the sensor device and/or of the time detected by the time measuring device. Based upon the determined ageing state, it can be deduced whether the valve must be replaced (for instance if switching times become too long). Therefore, as a function of the detected measurement value, a signal which indicates whether a valve or a valve device should be replaced can be output to an operator, in particular by the evaluation device.

Furthermore, embodiments of the present invention are directed to a method for the treatment of containers, in particular for reshaping plastic parisons into plastic containers, comprising a plurality of blow moulding stations each having blow mould devices which form a cavity, inside which the plastic parisons can be reshaped into plastic containers, with at least one application device, by means of which a flowable medium can be applied to the plastic containers, in particular the plastic parisons for expansion thereof, and with at least one valve device which is arranged between at least one pressure reservoir and at least one application device and which influence or control the supply and/or discharge of the flowable medium, in particular under high pressure, in particular the blowing pressure and/or volume flow thereof, to the application device.

According to embodiments of the invention a regulation of a state the valve device, in particular of an open state and/or a closed state of the valve device, or performance of a change to a state of the valve device is carried out or takes place at a predetermined time for treatment of the plastic containers. In this case the method can be equipped or performed with all features already described in connection with the device as well as combinations thereof.

Thus, in the context of the method according to embodiments of the invention it is also proposed that a specific state, for instance the position of a valve piston, of the valve device, is queried in a first treatment cycle. Particularly in each blow moulding station, measurements of the times from the electrical switching signals of a change to the switching state of the valve device up to the (actual) actuation of a sensor, a proximity switch, are carried out. In a further, particularly next following treatment cycle of the blow moulding station the measured times are included as lead time in the calculations. This takes place by selection, in this further treatment cycle, of the switching time (for emitting the electrical switching signal to the control) for the valve device in such a way that the target switching time of the valve device is chosen to be earlier (or later) by the measured lead time from the preceding (first) treatment cycle.

In an advantageous embodiment the regulation is performed or takes place by means of a change of a switching time of the valve device.

BRIEF DESCRIPTION

Some of the embodiments will be described in detail, with reference to the following figures, wherein like designations denote like members, wherein.

DETAILED DESCRIPTION

Figure 1:
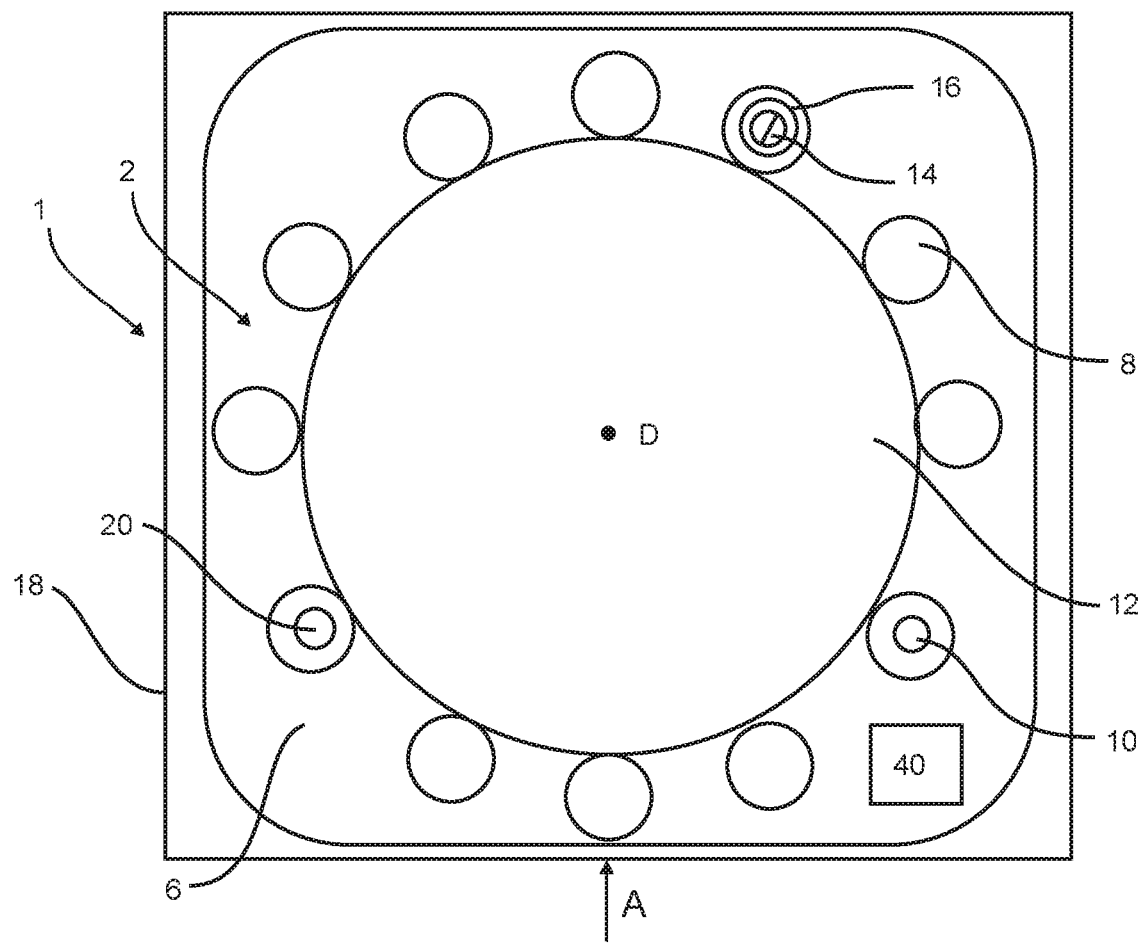
FIG. 1 shows a schematic representation of a machine according to embodiments of the invention.

FIG. 1 shows a schematic representation of a device 1 for reshaping plastic parisons 10 into plastic containers 20. In this case the plastic parisons 10 are fed to the individual reshaping stations or blow moulding stations 8 and are expanded to form plastic containers 20, while they are being transported by a transport device 2. After this expansion the plastic containers 20 are removed from the device 1 again. For this purpose, a feed starwheel can be provided which delivers the plastic parisons to the machine 1 and also a discharge device, in particular likewise a transport starwheel, which discharges the finally expanded containers 20 from the device 1. The device 1 has a station support 12 on which a plurality of blow moulding stations 8 are arranged. In this case this station support may be for example, as shown in FIG. 1, a blow moulding wheel which is rotatable with respect to an axis of rotation D (which here extends perpendicular to the drawing plane and thus vertically). In this case each individual blow moulding station has a respective blow mould device 14. This blow mould device 14 is composed of two side parts and a base part. In this case the blow mould devices 14 are arranged on blow mould supports 16. In this case the transport device 2 transports the individual blow moulding stations 8 along a complete circular line. The reference A designates for example a starting position, at which for instance the blow mould devices 14 are opened and a plastic parison 10 is introduced into the blow moulding station 8. This plastic parison is reshaped into a plastic container 20 in the course of the rotation of the blow moulding station 8 about the axis of rotation D and in the form of a container is removed from the blow moulding station 8 again. During all the interposed treatment steps the blow moulding station is advantageously in rotation. After the plastic container 20 is removed from the blow moulding station 8 it again reaches the starting position A and a new treatment cycle or a new round of the blow moulding station 8 begins with an expansion operation of a new plastic parison.

Figure 2:
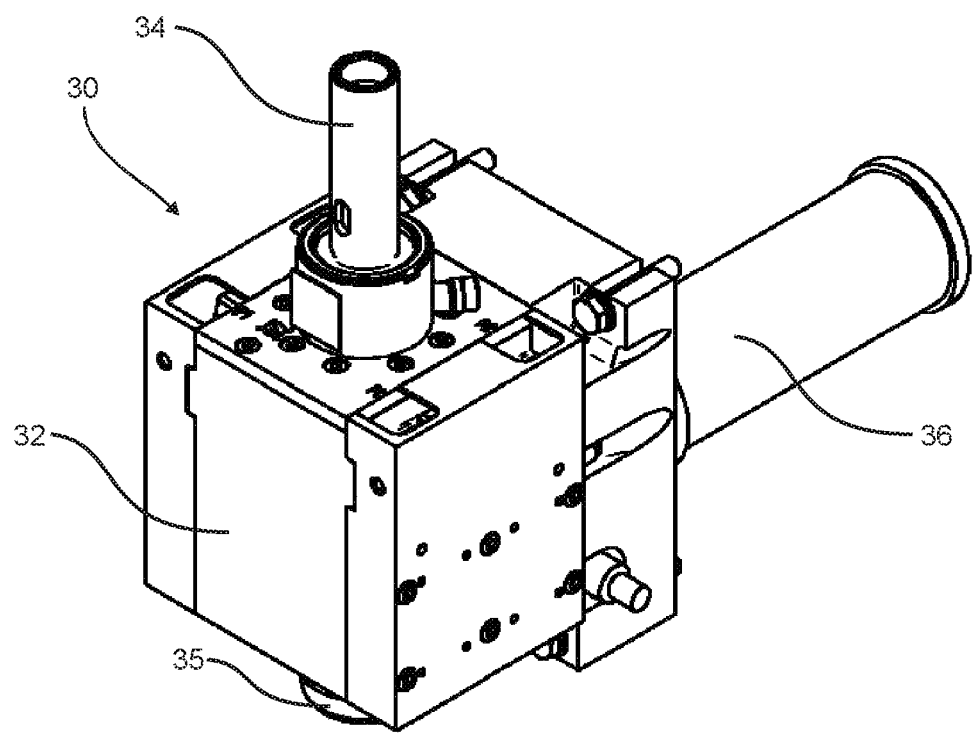
FIG. 2 shows a perspective representation of a valve block.

FIG. 2 shows a perspective representation of a valve block 32, which is designed as a valve device 30 for controlling a flowable medium from a connection of the valve block 32 for feeding flowable medium (for instance flowable medium) to the application device 35. The application device 35 is usually designed as a blow moulding die which is placed onto the mouth of the plastic parisons 10 located in the blow moulding stations 8 and flowable medium is then applied to these parisons. In this case the valve block 32 comprises not only (at least) one valve device 30, which controls the feeding of the flowable medium to the application device 35, but also a valve device 30, by means of which the interior of the finally expanded plastic containers 20 can again be relieved of load (by means of the application device 35) and at least some of the flowable medium is discharged by means of a connector 36 of the valve block. This medium can then be recycled and at least some of it can be used for a further expansion operation. Furthermore, the valve block 32 has an insertion opening, through which a stretching rod can be guided, through the middle of the application device 35, and can carry out a longitudinal expansion of the plastic parison 10, while a flowable medium is additionally applied to it.

Figure 3:
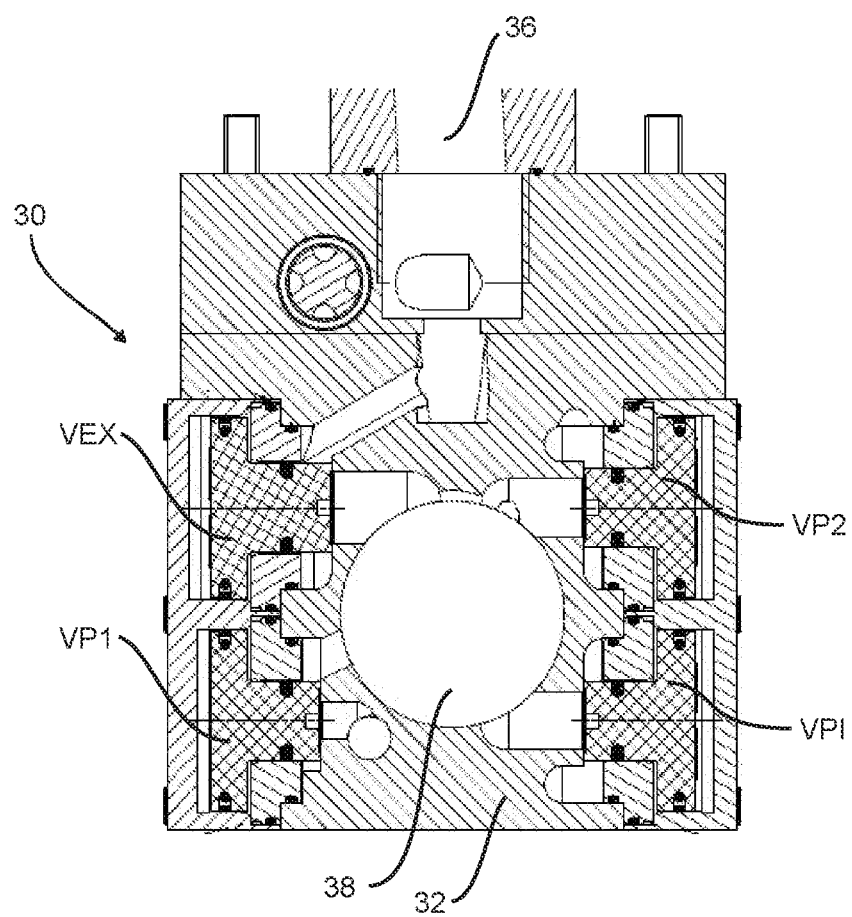
FIG. 3 shows a cross-section through a valve block.

FIG. 3 shows a cross-section through a valve block 32. It can be seen that the valve block 30 has four valves VEX, VP1, VP2 and VPI. Each of these valves VEX, VP1, VP2 and VPI can produce or interrupt or also influence a flow connection to the duct 38 and thus can control the fluid flow (at least intermittently) through the valve block 32. The reference 38 designates a duct, through which on the one hand flowable medium can be carried to the application device 35 or away from it and through which on the other hand a stretching rod can be guided through the valve block 32 to the plastic parison 10 located in the blow moulding station 8 and this plastic parison can be expanded along its longitudinal axis by means of the stretching rod. The reference VEX designates a so-called exhaust valve or venting valve, by means of which the blow moulding station 8 or the finish-blow moulded plastic container 20 located therein can be relieved of pressure at least in part. For this relief valve VEX a regulating device can also be provided which in particular regulates a switching time of the valve device 30. At least a proportion of the flowable medium flows from the plastic containers 20 into at least one pressure reservoir by means of the relief valve VEX. The valve block has a valve VP1 which controls a flowable medium for preliminary blow moulding of the plastic parison with a first pressure P1. Furthermore a valve VPI is provided, which controls the flow of flowable medium, from a second pressure reservoir, which provides the flowable medium with an intermediate pressure PI for intermediate blow moulding of the plastic parison with this second pressure PI. In this case intermediate pressure PI is greater than the first pressure P1. Furthermore, a third valve VP2 is provided, which controls the application of flowable medium to the plastic parison 10 at a third pressure P2, which in turn is higher than the second pressure PI, for final blow moulding of this plastic parison 10. This pneumatic medium at the third pressure P2 is provided from a third pressure reservoir. All valves VEX, VP1, VPI and VP2 can have a regulating device according to embodiments of the invention. However, it is also conceivable that at least, and only for the preliminary blow moulding valve VP1, a regulating device is provided. In fact, it has been shown that in particular the preliminary blow moulding has a major influence on the container quality, whilst the intermediate blow moulding pressure serves predominantly to reduce the consumption of air.

Figure 4:
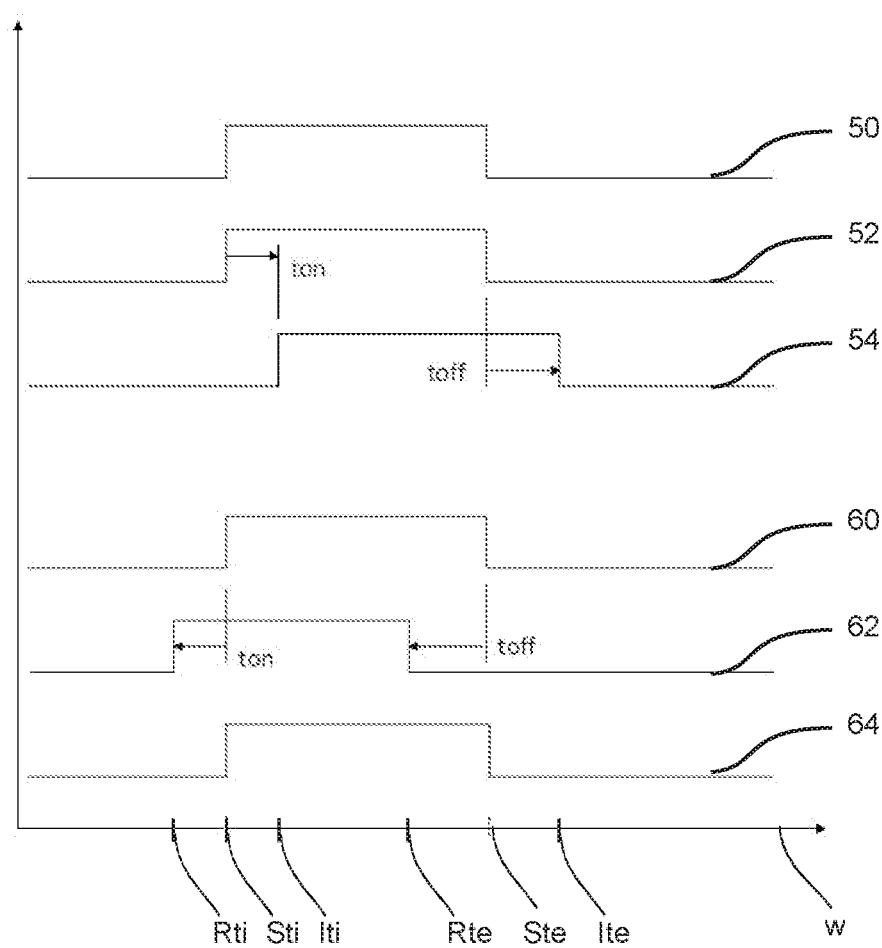
FIG. 4 shows a comparison of the regulation of the control of a valve device according to embodiments of the invention by comparison with conventional art.

FIG. 4 shows a comparison of the regulation of the control of a valve device 32 according to embodiments of the invention by comparison with a previous control of the valve device 32 according to the conventional art.

The upper three lines 50, 52 and 54 show a progression of a switching state of a valve device 30 or of a valve as a function of the process angle w (preferred for instance the angle which an imaginary geometric connecting line between the respective blow moulding station 8 and the axis of rotation D encloses with the imaginary geometric connecting line between the starting position A and the axis of rotation D) and thus corresponds to a temporal progression. In this case the line 50 illustrates a desirable switching state of the valve device 30, a predetermined setup of the switching state or control state of the valve device 30. At a (treatment) time or process angle Sti (the target time initial Sti) the valve device 30 should be switched for instance from an open state into a closed state or also from a closed state into an open state. Corresponding to this desired time progression 50, a corresponding electrical means of the valve device 32 then also takes place, which can be illustrated for instance by the line 52. First of all, a pilot control device, for instance a pneumatically operating pilot valve (pneumatic valve), is controlled by means of the electrical control. The configuration of such a switching state of the pilot valve can also be illustrated for instance by the line 52. In this case it can be seen that likewise at the time Sti there is a change from one state into another. The line 54, the third from the top, illustrates (schematically) an actual temporal progression of the position of the valve piston of the valve device 30. It can be seen that this does not, as desired, follow the desirable temporal progression 50 (of the setup) of the switching state or of the control state of the valve device 30, but proceeds with a time delay with respect to both switching operations at the times Sti and Ste. In other words, performing the change of a switching state at the target switching time Sti, for instance initiated by electrical switching signals, does not take effect immediately, by correspondingly changing the position of the valve piston substantially immediately, but only with a time delay, after a certain reaction time or switching time (in this case the time difference ton between the actual switching time Iti and the target switching time Sti). The same applies for performing the change of the switching state at the target switching time Ste, which likewise does not take effect immediately, but the position of the valve piston only changes with a time delay (after the switching time corresponding to the time difference between Ite and Ste) at the actual time Ite. However, in the case of pneumatic valves this switching time is not constant or consistent, but is subject to a certain variation.

Therefore, the device according to embodiments of the invention is based on the idea of measuring this switching time in every round or in every treatment state, and including it in the following treatment state as lead time.

This is illustrated (schematically) in the bottom three lines. It is no longer the target switching time Sti which is selected as a switching time of the valve device 30, but a time Rti which is earlier by the measured switching time ton, which is illustrated by the line 62. Through the inclusion of the measured switching time as lead time, the resulting actually effected change to the position of the valve piston of the valve device 30, illustrated by the line 64, corresponds substantially to the predetermined "setup", that is to say the desirable or predetermined position of the valve piston, illustrated by the line 60, or at least a time delay is significantly smaller. The same applies for the second switching time Ste illustrated in FIG. 4. Here too the measured switching time toff from the preceding round or from the preceding treatment cycle is included as lead time (see line 62) and the electrical switching signal is emitted earlier by this measured switching time toff, specifically at the time Rte (corresponding to the time Ste minus toff). In this way again a clear approximation of the actual change to the position of the valve piston (illustrated by the line 64) to the predetermined setup 60 is achieved.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCES 1 device
2 transport device
6 base support
8 blow station
10 plastic parison
14 blow mould device
16 blow mould support
18 clean room
20 plastic container
30 valve device
32 valve block
34 insertion opening for a stretching rod
36 connector for discharging flowable medium
35 application device
38 duct
40 control device
D axis of rotation
A starting position
VEX exhaust valve or relief valve
VP1, VP2, VPI valves
w process angle
Rti, Sti, Iti, states
Rte, Ste, Ite states

The invention claimed is:

1. A device for reshaping plastic parisons into plastic containers, comprising a plurality of blow moulding stations each having blow mould devices which form a cavity, inside which the plastic parisons can be reshaped into plastic containers, and including at least one application device by which a flowable medium can be applied to the plastic parisons for expansion thereof, and at least one valve device which is arranged between at least one pressure reservoir and at least one application device and by which at least one of the supply and removal of the flowable medium, under high pressure, wherein at least one of the blowing pressure and volume flow thereof, to the application device can be influenced or controlled, wherein the device has at least one regulating device, which is suitable and intended to regulate a state of the valve device, in at least one of an open state and a closed state of the valve device, at a predetermined time for treatment of the plastic containers, wherein the plastic parisons are transported along a circular path and a plurality of blow moulding stations can be arranged on a blow moulding wheel and wherein the regulating device has at least one sensor device which at least intermittently detects at least one measurement value which is at least indirectly characteristic for a current control effected by the valve device for at least one of feeding and discharging the flowable medium, for a state of the valve device, and the regulating device at least one of performs and effects regulation as a function of this detected measurement value.

2. The device according to claim 1, wherein the device has at least one pneumatically operating pilot control device, which is suitable and intended for activating the valve device, and the regulating device at least one of implements and performs a regulation of the valve device exclusively by control of the pilot control device.

3. The device according to claim 2, wherein the pneumatically operating pilot control device is suitable and intended for, at least indirectly and directly, influencing the control of at least one of the feeding and discharge of the flowable medium effected by the valve device.

4. The device according to claim 1, wherein the valve device has at least one valve which has a valve piston guided in a cylinder, and at least one of the blowing pressure and the volumetric flow rate of the flowable medium depends at least at times upon the position of the valve position.

5. The device according to claim 4, wherein the sensor device at least intermittently detects the position of the valve piston inside the cylinder and the regulating device performs the regulation of the valve device as a function of this position.

6. The device according to claim 1, wherein the sensor device is selected from a group comprising microswitches, inductive proximity switches, other electronic or electromechanical components or combinations thereof.

7. The device according to claim 1, wherein it has at least one time measuring device which at least intermittently detects at least one time at which the valve device reaches a predetermined state, in at least one of a predetermined open and closed state.

8. The device according to claim 1, wherein the device has a time measuring device which at least intermittently detect(s) a time at which the measurement value detected by the sensor device reaches and/or exceeds a predetermined measurement value.

9. The device according to either claim 7 or claim 8, wherein the device has an evaluation device which compares at least the time measured by the time measuring device with a predetermined time and as a function of the result of this comparison it performs a change to the control of the valve device.

10. The device according to claim 1, wherein it has more than one valve device and a plurality of valve devices by which the supply of pressure to the application device is controllable at various pressure levels, and a separate regulating device is associated with each valve device.

11. The device according to claim 1, wherein the valve device has at least one relief valve, by which the blow moulding station and the blow mould device) thereof can be at least partially relieved of pressure.

12. The device according to claim 1, wherein the evaluation device is suitable and intended for determining an aging state of at least one valve of the valve device at least intermittently as a function of the measurement value detected by at least one of the sensor device and of the time detected by the time measuring device.

13. A method for treatment of plastic containers, reshaping plastic parisons into plastic containers, comprising a plurality of blow moulding stations each having blow mould devices which form a cavity, inside which the plastic parisons can be reshaped into plastic containers, and including at least one application device by which a flowable medium can be applied to the plastic parisons for expansion thereof, and at least one valve device which is arranged between at least one pressure reservoir and at least one application device and which influence or control at least one of the supply and removal of the flowable medium under high pressure, to the application device can be influenced or controlled, wherein a regulation of a state the valve device, or performance of a change to a state of the valve device is carried out or takes place at a predetermined time for treatment of the plastic containers, wherein the plastic parisons are transported along a circular path and a plurality of blow moulding stations can be arranged on a blow moulding wheel and wherein a regulating device is provided which has at least one sensor device which at least intermittently detects at least one measurement value which is at least indirectly characteristic for a current control effected by the valve device for at least one of feeding and discharging the flowable medium, for a state of the valve device, and the regulating device at least one of performs and effects regulation as a function of this detected measurement value.

14. The method according to claim 13, wherein the regulation is at least one of performed and takes place by a change to a switching time of the valve device.

15. The device according to claim 1, wherein the blow moulding stations in each case have a stretching rod for expanding the plastic parisons and the valve device has an insertion opening, through which the stretching rod can be guided.

16. The device according to claim 1, wherein an individual regulation is carried out for each blow moulding station.

17. The device according to claim 1, wherein regulation takes place by comparison of the actual state with the target state of the valve device at the predetermined treatment time or the predetermined process and an adaptation of characteristic parameters for the state of the valve device.

18. The device according to claim 1, wherein the regulating device instigates such a measurement of the sensor device for each switching operation of the valve device.

19. The device according to claim 9, wherein this time is used as a control variable within the regulation.

* * * * *